(12) United States Patent
Kamiya et al.

(10) Patent No.: US 11,938,924 B2
(45) Date of Patent: Mar. 26, 2024

(54) DRIVING ASSISTANCE CONTROL APPARATUS FOR VEHICLE, DRIVING ASSISTANCE CONTROL SYSTEM FOR VEHICLE, AND DRIVING ASSISTANCE CONTROL METHOD FOR VEHICLE

(71) Applicants: DENSO CORPORATION, Kariya (JP); TOYOTA JIDOSHA KABUSHIKI KAISHA, Toyota (JP)

(72) Inventors: Kei Kamiya, Kariya (JP); Toshinori Okita, Gotemba (JP); Tasuku Usui, Gotemba (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 573 days.

(21) Appl. No.: 17/138,700

(22) Filed: Dec. 30, 2020

(65) Prior Publication Data

US 2021/0114591 A1 Apr. 22, 2021

Related U.S. Application Data

(63) Continuation of application No. PCT/JP2019/023935, filed on Jun. 17, 2019.

(30) Foreign Application Priority Data

Jul. 5, 2018 (JP) ................................ 2018-127978

(51) Int. Cl.
*B60W 30/09* (2012.01)
*B60W 30/095* (2012.01)

(52) U.S. Cl.
CPC ........ *B60W 30/09* (2013.01); *B60W 30/0953* (2013.01); *B60W 30/0956* (2013.01); *B60W 2510/18* (2013.01); *B60W 2554/4049* (2020.02)

(58) Field of Classification Search
CPC ............ B60W 30/09; B60W 30/0953; B60W 30/0956; B60W 2510/18;
(Continued)

(56) References Cited

U.S. PATENT DOCUMENTS

| 47,473 A | 4/1865 | Zalmon et al. |
|---|---|---|
| 2010/0214155 A1 | 8/2010 | Harada |

(Continued)

FOREIGN PATENT DOCUMENTS

| DE | 102017210377 A1 | 12/2012 |
|---|---|---|
| DE | 102012208988 A1 | 12/2018 |

(Continued)

*Primary Examiner* — Donald J Wallace
*Assistant Examiner* — Daniel M. Robert
(74) *Attorney, Agent, or Firm* — MASCHOFF BRENNAN

(57) ABSTRACT

In a driving assistance control apparatus for a vehicle, an acquirer acquires a detected traveling state of the vehicle and a detected traveling state of another vehicle. A controller determines whether to perform braking assistance using a deterministic indicator for collision including at least one of a time, a distance, and a required deceleration to collision with the other vehicle and a deterministic indicator for crossing including at least one of a time, a distance, and a required deceleration to reaching a path of travel of the other vehicle. The deterministic indicator for collision and the deterministic indicator for crossing are acquired using the acquired traveling state of the vehicle and the acquired traveling state of the other vehicle. Further, in response to determining to perform the braking assistance, the controller causes a driving assistance unit to perform the braking assistance.

11 Claims, 10 Drawing Sheets

(58) Field of Classification Search
CPC ...... B60W 2554/4049; B60T 2201/022; B60T 7/22; G08G 1/166
See application file for complete search history.

(56) References Cited

U.S. PATENT DOCUMENTS

| | | |
|---|---|---|
| 2012/0130629 A1 | 5/2012 | Kim |
| 2012/0306663 A1 | 12/2012 | Mudalige |
| 2014/0139368 A1 | 5/2014 | Takaki |
| 2015/0232073 A1* | 8/2015 | Fujishiro ............... B60W 30/09 701/70 |
| 2016/0140847 A1 | 5/2016 | Kawamata et al. |
| 2016/0185348 A1 | 6/2016 | Miura et al. |
| 2016/0335892 A1* | 11/2016 | Okada .................... G08G 1/123 |
| 2016/0362104 A1 | 12/2016 | Miller et al. |
| 2017/0132930 A1* | 5/2017 | Ando ..................... G08G 1/163 |
| 2017/0327112 A1* | 11/2017 | Yokoyama ........ B60W 30/0956 |
| 2017/0330461 A1* | 11/2017 | Caveney ................ G08G 1/166 |
| 2018/0032082 A1* | 2/2018 | Shalev-Shwartz ... G05D 1/0246 |
| 2019/0001973 A1 | 1/2019 | Matsunaga |
| 2019/0061750 A1* | 2/2019 | Tamura ................ B60W 30/09 |
| 2019/0263344 A1 | 8/2019 | Yokoi |

FOREIGN PATENT DOCUMENTS

| | | |
|---|---|---|
| EP | 3 360 745 A1 | 8/2018 |
| GB | 2544674 A | 5/2017 |
| JP | 2014-102703 A | 6/2014 |
| JP | 2016-095697 A | 5/2016 |
| JP | 2018-67102 A | 4/2018 |

\* cited by examiner

DRIVING ASSISTANCE CONTROL APPARATUS FOR VEHICLE, DRIVING ASSISTANCE CONTROL SYSTEM FOR VEHICLE, AND DRIVING ASSISTANCE CONTROL METHOD FOR VEHICLE

CROSS-REFERENCE TO RELATED APPLICATION

This application is based on and claims the benefit of priority from earlier Japanese Patent Application No. 2018-127978 filed Jul. 5, 2018, the description of which is incorporated herein by reference.

BACKGROUND

Technical Field

This disclosure relates to a technique for controlling vehicle driving assistance to inhibit or avoid a collision with an object.

Related Art

A time to collision (TTC) is known as an indicator for determining a likelihood of collision between an own vehicle and a target, such as another vehicle or the like. A technique is known for increasing the determination accuracy of the likelihood of collision using the time to collision by taking into account a direction toward the target.

DESCRIPTION OF SPECIFIC EMBODIMENTS

Figure 1:
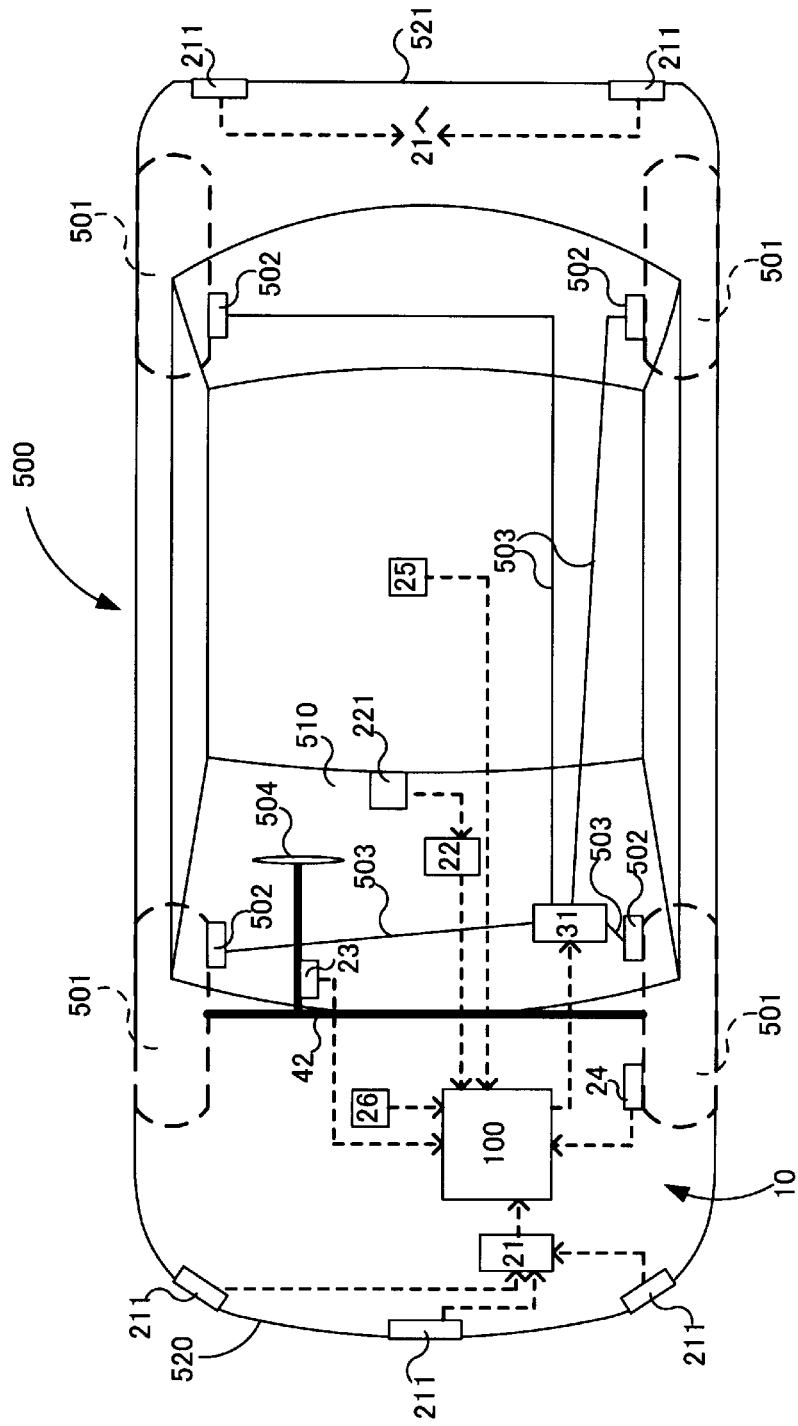
FIG. 1 is an illustration of an example of a vehicle equipped with a driving assistance control apparatus according to a first embodiment.

Regarding the above known technique, as disclosed in, for example, JP-A-2014-102703, in cases where the own vehicle crosses a path of travel of another vehicle, for example, in cases where the own vehicle makes a turn at an intersection and then enters a path of travel of another vehicle or in cases where the own vehicle crosses a path of travel of another vehicle at an intersection without making a turn at the intersection, performing braking assistance based on a likelihood-of-collision determination made based on a time to collision may cause the own vehicle to come to rest on the path of travel of the other vehicle and thus fail to avoid the collision.

In view of the foregoing, it is desired to have a driving assistance technique for inhibiting or preventing a collision between an own vehicle and another vehicle when the own vehicle crosses a path of travel of the other vehicle.

The present disclosure can be implemented in aspects described below.

A first aspect provides a driving assistance control apparatus for a vehicle. The driving assistance control apparatus according to the first aspect includes: an acquirer configured to acquire a detected traveling state of the vehicle and a detected traveling state of an other vehicle; a controller configured to determine whether to perform braking assistance using a deterministic indicator for collision including at least one of a time to collision with the other vehicle, a distance to collision with the other vehicle, and a required deceleration to collision with the other vehicle and a deterministic indicator for crossing including at least one of a time to reaching a path of travel of the other vehicle, a distance to reaching a path of travel of the other vehicle, and a required deceleration to reaching a path of travel of the other vehicle, the deterministic indicator for collision and the deterministic indicator for crossing being acquired using the acquired traveling state of the vehicle and the acquired traveling state of the other vehicle, and in response to determining to perform the braking assistance, cause a driving assistance unit to perform the braking assistance.

The driving assistance control apparatus for the vehicle according to the first aspect can inhibit or prevent a collision between the vehicle and the other vehicle when the vehicle is traveling along a path of travel crossing a path of travel of the other vehicle.

A second aspect provides a driving assistance control apparatus for a vehicle in an intersection. The driving assistance control apparatus according to the second aspect includes: an acquirer configured to acquire a traveling state of the vehicle and a traveling state of an other vehicle that enters the intersection from an oncoming lane; a controller configured to determine whether to perform braking assistance using a deterministic indicator for collision including at least one of a time to collision with the other vehicle, a distance to collision with the other vehicle, and a required deceleration to collision with the other vehicle and a deterministic indicator for crossing including at least one of a time to reaching a path of travel of the other vehicle, a distance to reaching a path of travel of the other vehicle, and a required deceleration to reaching a path of travel of the other vehicle, the deterministic indicator for collision and the deterministic indicator for crossing being acquired using the acquired traveling state of the vehicle and the acquired traveling state of the other vehicle, and in response to determining to perform the braking assistance, cause a driving assistance unit to perform the braking assistance.

The driving assistance control apparatus for a vehicle in an intersection according to the second aspect can inhibit or prevent a collision between the vehicle and the other vehicle when the vehicle is traveling along a path of travel crossing a path of travel of the other vehicle.

A third aspect provides a driving assistance system. The driving assistance system according to the third aspect includes: the driving assistance control apparatus according to the first aspect; a first detector configured to detect the traveling state of the vehicle, and a second detector configured to the traveling state of the other vehicle; and a driving assistance unit configured to perform the braking assistance.

The driving assistance system according to the third aspect can inhibit or prevent a collision between the vehicle and the other vehicle when the vehicle is traveling along a path of travel crossing a path of travel of the other vehicle.

A fourth aspect provides a driving assistance control method for a vehicle. The driving assistance control method according to the fourth aspect includes: acquiring a detected traveling state of the vehicle and a detected traveling state of an other vehicle; determining whether to perform braking assistance using a deterministic indicator for collision including at least one of a time to collision with the other vehicle, a distance to collision with the other vehicle, and a required deceleration to collision with the other vehicle and a deterministic indicator for crossing including at least one of a time to reaching a path of travel of the other vehicle, a distance to reaching a path of travel of the other vehicle, and a required deceleration to reaching a path of travel of the other vehicle, the deterministic indicator for collision and the deterministic indicator for crossing being acquired using the acquired traveling state of the vehicle and the acquired traveling state of the other vehicle, and in response to determining to perform the braking assistance, causing a driving assistance unit to perform the braking assistance.

The driving assistance control method according to the fourth aspect can inhibit or prevent a collision between the vehicle and the other vehicle when the vehicle is traveling along a path of travel crossing a path of travel of the other vehicle.

A fifth aspect provides a driving assistance control method for a vehicle in an intersection. The driving assistance control method according to the fifth aspect includes: acquiring a traveling state of the vehicle and a traveling state of an other vehicle that enters the intersection from an oncoming lane; determining whether to perform braking assistance using a deterministic indicator for collision including at least one of a time to collision with the other vehicle, a distance to collision with the other vehicle, and a required deceleration to collision with the other vehicle and a deterministic indicator for crossing including at least one of a time to reaching a path of travel of the other vehicle, a distance to reaching a path of travel of the other vehicle, and a required deceleration to reaching a path of travel of the other vehicle, the deterministic indicator for collision and the deterministic indicator for crossing being acquired using the acquired traveling state of the vehicle and the acquired traveling state of the other vehicle, and in response to determining to perform the braking assistance, causing a driving assistance unit to perform the braking assistance.

The driving assistance control method for a vehicle in an intersection according to the fifth aspect can inhibit or prevent a collision between the vehicle and the other vehicle when the vehicle is traveling along a path of travel crossing a path of travel of the other vehicle.

The present disclosure can also be carried out as a driving assistance control program for a vehicle or a computer-readable recording medium recording the program.

Hereinafter, some embodiments of a driving assistance control apparatus for a vehicle, a driving assistance system for a vehicle, and a driving assistance control method for a vehicle according to the present disclosure will be described.

First Embodiment

As illustrated in FIG. 1, a driving assistance control apparatus 100 for a vehicle according to a first embodiment is installed and used in a vehicle 500. The driving assistance control apparatus 100 includes at least a controller and an acquirer. A driving assistance system 10 may include, in addition to the driving assistance control apparatus 100, a detection unit and a driving assistance unit. The detection unit includes a radar ECU 21, a millimeter-wave radar 211, a camera ECU 22, a rotation angle sensor 23, a wheel speed sensor 24, a yaw rate sensor 25, and a positioning sensor 26. The driving assistance unit includes a driving assistance device 31. The vehicle 500 includes wheels 501, brake devices 502, a brake line 503, a steering wheel 504, a front windshield 510, a front bumper 520, and a rear bumper 521. The radar ECU 21 is connected to millimeter radars 211 that emit radio waves and use reflected waves from a target acquired by the millimeter radars 211 to generate and output detection signals indicating the target by reflection points. The camera ECU 22 is connected to a monocular camera 221 and uses an image acquired by the camera 221 and prepared shape patterns for targets to generate and outputs a detection signal indicating the target by the image. Each of the ECUs 21 and 22 is a micro-processor including a processing unit, a storage unit, and an input/output interface. Detectors that detect reflected waves may be laser radars (LIDARs) or ultrasonic wave detectors that emit sound waves and detect reflected waves, instead of the millimeter radars 211. The image capturing unit that captures images of the target may be a stereo camera or a multi-camera formed of two or more cameras, instead of the monocular camera 221. In addition, a rear camera or side cameras may be provided.

The brake devices 502 are included in respectively corresponding wheels 501. The brake devices 502 are, for example, disc brakes or drum brakes that apply brakes to the respectively corresponding wheels 501 by braking force depending on a brake fluid pressure supplied via the brake line 503 in response to the driver's operation on the brake pedal, thereby implementing braking of the vehicle 500. The brake line 503 includes a brake piston and a brake fluid line that generate a brake fluid pressure in response to a brake pedal operation. Instead of the brake fluid line, the brake line 503 may be a control signal line that is configured to activate an actuator included in each of the brake devices 502.

The steering wheel 504 is connected to the front wheels 501 via a steering device 42 including a steering rod, a steering mechanism, and a turn axle. The steering device 42 may be provided with a steering power assistance device for reducing the steering force.

The driving assistance device 31 is provided along the brake line 503. In the present embodiment, the driving assistance device 31 is a braking assistance device capable of performing fluid pressure control by an actuator, for example, an electric motor, independently from a brake pedal operation. The driving assistance device 31 performs braking assistance in response to results of detection by the millimeter radars 211 and the camera 221.

Figure 2:
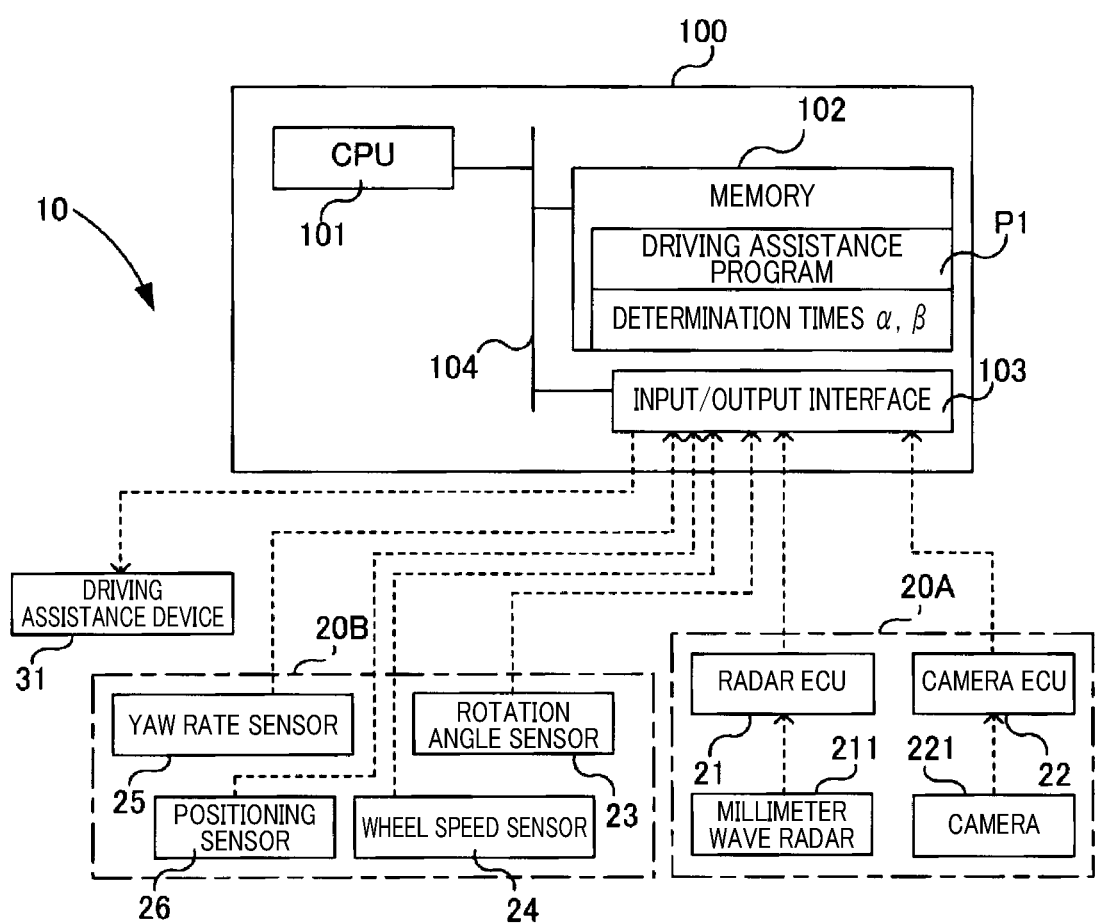
FIG. 2 is a functional block diagram of the driving assistance control apparatus according to the first embodiment.

As illustrated in FIG. 2, the driving assistance control apparatus 100 includes a central processing unit (CPU) 101 and a memory 102 as a controller, an input/output interface 103 as the acquirer, and a bus 104. The CPU 101, the memory 102, and the input/output interface 103 are connected together via the bus 104 in a manner being capable of bidirectional communication. The memory 102 includes a memory storing a driving assistance program P1 for performing driving assistance in a non-volatile and read-only manner, such as a ROM, and a memory readable and writable by the CPU 101, such as a RAM. The memory 102 further stores a first determination time α and a second determination time β as different determination thresholds used to determine whether to perform braking assistance. The CPU 101 loads the driving assistance program P1 from the memory 102 into the readable/writable memory and executes the same to determine whether to perform braking assistance. If determining to perform braking assistance, the CPU 101 controls the driving assistance device 31 to perform braking assistance. The CPU 101 may include a single CPU, a plurality of CPUs executing various programs, or a multi-core CPU that can perform a plurality of programs at the same time.

The input/output interface 103 is connected to the radar ECU 21, the camera ECU 22, the rotation angle sensor 23, the wheel speed sensor 24, the yaw rate sensor 25, the positioning sensor 26, and the driving assistance device 31 via their respective control signal lines. The input/output interface 103 receives detection signals from the radar ECU 21, the camera ECU 22, the rotation angle sensor 23, the wheel speed sensor 24, the yaw rate sensor 25, and the positioning sensor 26. The input/output interface 103 outputs control signals indicating an operating state of the vehicle, such as a brake level, to the driving assistance device 31. Thus, the input/output interface 103 serves as the acquirer that acquires a traveling state of the own vehicle and a traveling state of another vehicle detected by the various sensors. The radar ECU 21 and the millimeter radars 211, and the camera ECU 22 and the camera 221 serve as a first detector 20A that detects a traveling state of the own vehicle. The rotation angle sensor 23, the wheel speed sensor 24, the yaw rate sensor 25, and the positioning sensor 26 serve as a second detector 20B that detects a traveling state of another vehicle. As used herein, the term "own vehicle" refers to a vehicle equipped with the driving assistance control apparatus 100.

The millimeter radars 211 emit millimeter waves and receive one or more reflected waves from one or more reflection points on a target. In the present embodiment, the millimeter radars 211 are located on the center and both sides of the front bumper 520 and on both sides of the rear bumper 521. Unprocessed detection signals output from the millimeter radars 211 are processed by the radar ECU 21 and then input as detection signals of a distance, a relative speed, and an azimuth of the target to the driving assistance control apparatus 100. In an alternative embodiment, the radar ECU 21 may not be provided, where signals indicating unprocessed reception waves may be input as detection signals from the millimeter radars 211 to the driving assistance control apparatus 100 and the driving assistance control apparatus 100 may be perform signal processing to determine a position, a relative speed, and a distance to the target. For example, the target may include a vehicle other than the own vehicle, a bicycle, a pedestrian, a guardrail or the like.

The camera 221 is an imaging device that includes a single imaging element, such as a charge-coupled device (CCD), and is a sensor that detects outer shape information of an object by receiving visible light and outputs a detection result as image data. In the present embodiment, the camera 221 is located at the upper center of the front windshield 510. The image data output from the camera 221 is subjected to a feature point extraction process by the camera ECU 22. A pattern indicated by the extracted feature points is compared with a prepared comparative pattern indicating an outer shape of an object to be discriminated, that is, a vehicle. If there is a match or similarity between the extracted pattern and the comparative pattern, a frame image showing the discriminated object is generated. If there is a mismatch or dissimilarity between the extracted pattern and the comparative pattern, that is, if these patterns are non-analogous, no frame image is generated. When the image data shows a plurality of objects, the camera ECU 22 generates a plurality of frame images showing the corresponding discriminated objects, and inputs them as a detection signal to the driving assistance control apparatus 100. Each frame image is represented by pixel data that includes positional information, that is, coordinate information of the discriminated object. The number of frame images that can be included in the detection signal depends on the bandwidth between the camera ECU 22 and the driving assistance control apparatus 100. Instead of providing the camera ECU 22 separately, unprocessed image data captured by the camera 221 may be input as a detection signal to the driving assistance control apparatus 100. In this case, the driving assistance control apparatus 100 may perform target discrimination using an outer shape pattern of the object to be discriminated. In the present embodiment, the pixel data output from the camera 221 is monochrome pixel data or color pixel data.

The rotation angle sensor 23 is a torque sensor that detects the amount of twist in the steering rod, that is, a steering torque caused by steering of the steering wheel 504, and detects the steering angle of the steering wheel 504. In the present embodiment, the rotation angle sensor 23 is attached to the steering rod connecting the steering wheel 504 and the steering mechanism. A detection signal output from the rotation angle sensor 23 indicates a voltage value proportional to the amount of twist.

The wheel speed sensors 24 are sensors that detect the rotation speeds of the wheels 501 and are provided to the respectively corresponding wheels 501. Detection signals output from the wheel speed sensors 24 are pulse waves that indicate the voltage value proportional to the wheel speed or a time interval corresponding to the wheel speed. Using the detection signals from the wheel speed sensors 24 makes it possible to obtain information about a vehicle speed, a distance travelled by the vehicle, and the like.

The yaw rate sensor 25 is a sensor that detects an angular speed of rotation of the vehicle 500. The yaw rate sensor 25 is located in the center of the vehicle, for example. A detection signal output from the yaw rate sensor 25 indicates a voltage value proportional to the rotation direction and the angular speed of rotation. The detected voltage value may indicate a lane change or a turn of the vehicle 500.

The positioning sensor 26 is a sensor that receives signals from satellites and base stations and determines a location of the own vehicle, such as a global navigation satellite system (GNSS) receiver or a mobile communication transceiver, for example. The location of the own vehicle is treated as current location information of the own vehicle.

Figure 3:
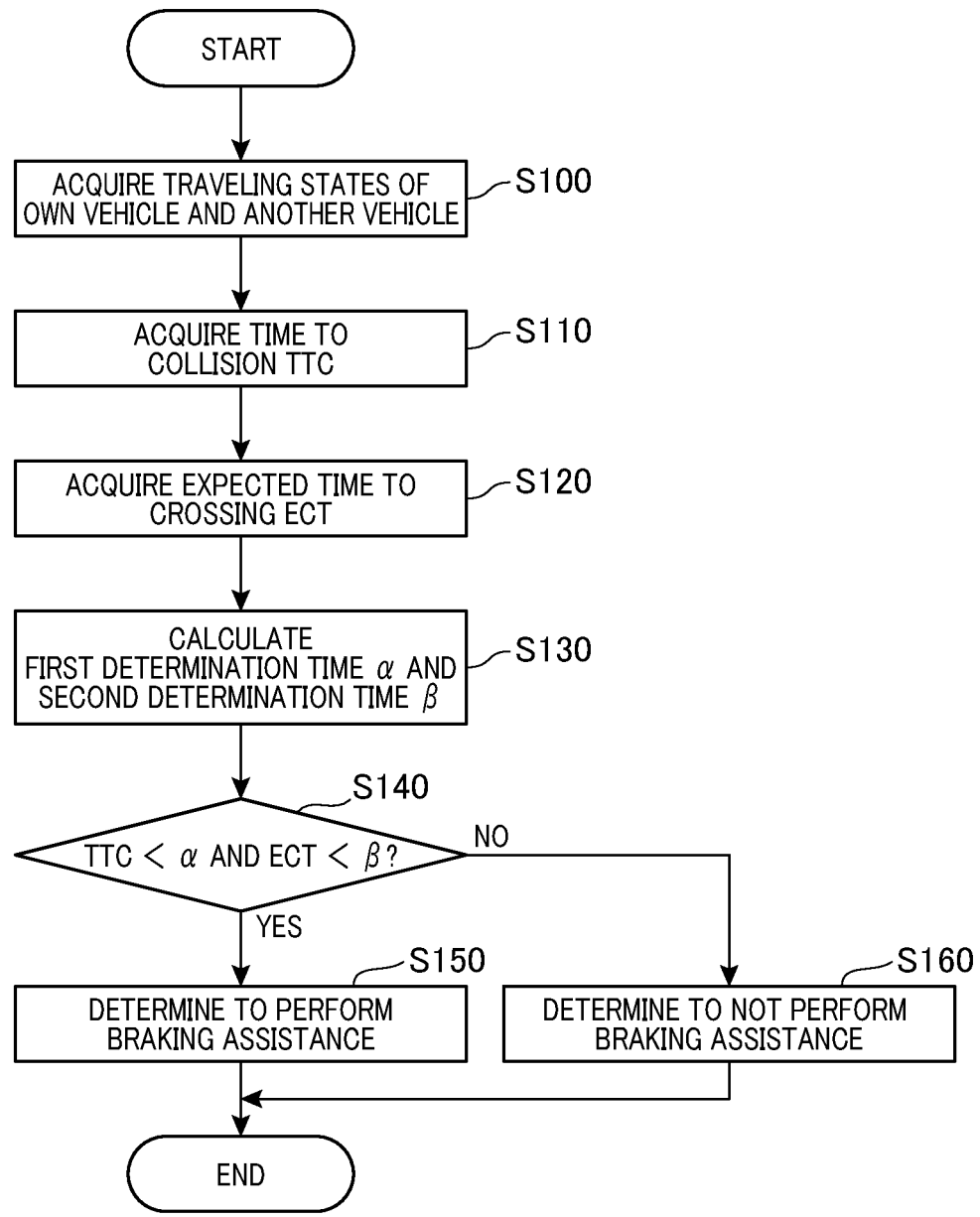
FIG. 3 is a flowchart of a driving assistance process performed by the driving assistance control apparatus according to the first embodiment.

A driving assistance process performed by the driving assistance control apparatus 100 according to the first embodiment will now be described. The process routine illustrated in FIG. 3 is repeatedly performed every predetermined time interval from start up to shut down of the control system of the vehicle or from turn-on to turn-off of the start switch. The driving assistance process in the present embodiment includes, for example, a braking assistance process. The braking assistance process includes rapid braking and slow braking for avoidance of a collision with another vehicle.

The CPU 101 acquires a traveling state of the own vehicle from the first detector 20A and a traveling state of another vehicle from the second detector 20B via the input/output interface 103 as the acquirer (at step S100). The traveling state of the own vehicle refers to information about the vehicle 500 and includes, for example, a travel speed, an orientation, an angular speed of rotation of the vehicle 500. The traveling state of the other vehicle refers to information about the outside of the vehicle 500 and includes, for example, a travel speed, an orientation, an angular speed of rotation of the other vehicle.

The CPU 101 calculates a time to collision (TTC) using the acquired traveling states of the own vehicle and the other vehicle (at step S110). The time to collision TTC (sec) is a time to collision with another vehicle under assumption that the own vehicle and the other vehicle continue their respective traveling states at the time of calculation. Typically, the TTC is used as a deterministic indicator for collision to determine whether to begin braking assistance for collision avoidance. In the present embodiment where either of the own vehicle and an oncoming other vehicle makes a turn, an intersection of paths of travel of the own vehicle and the oncoming other vehicle is calculated as a collision point K1, which is calculated according to the following equation: TTC=Dc/V0. Here, TTC is a time to collision that is a time it takes for the own vehicle to reach the collision point K1, Dc is a distance (m) from the own vehicle to the collision point K1, and V0 (m/s) is a speed of the own vehicle. The path of travel of the own vehicle is a travel trajectory of the lateral (or width-wise) center of the own vehicle. The path of travel of the other vehicle is a travel trajectory of the lateral (or width-wise) center of the other vehicle.

The path of travel of the own vehicle can be defined using the local coordinate system where, for example, the x-axis is in the lateral direction of the own vehicle and the y-axis is in the longitudinal direction of the own vehicle. When the own vehicle is traveling straight, for example, when the steering angle is zero degrees or within a predefined angle range, the path of travel of the own vehicle may be defined by a line extending in the y-axis direction from the lateral center of the own vehicle. When the own vehicle is turning, an estimated curvature radius R of the own vehicle may be calculated and the path of travel of the own vehicle may be defined by a circular arc of the curvature radius R. The estimated curvature radius R of the own vehicle is calculated according to the equation: R=V0/ω. Here, V0 (m/s) is a speed of the own vehicle acquired from the wheel speed sensor 24 and ω (rad/s) is an angular speed of rotation of the own vehicle acquired from the yaw rate sensor 25. The turning may include turning at an intersection with crossing the path of travel of the other vehicle, for example, turning right in the case of left-hand traffic or travelling along a curved roadway. In an alternative embodiment, the estimated curvature radius R may be acquired by a combination of a location of the own-vehicle acquired from the positioning sensor 26 and road shape information stored in the map information M1, by a steering angle of the steering wheel 504 acquired by the rotation angle sensor 23, by image processing using an image captured by the camera 221, or by matching process using the location of the own-vehicle determined by the positioning sensor 26 and the captured image.

The path of travel of the other vehicle may be defined by a compositional vector acquired by using speed components (V1x, V1y) of the other vehicle in the local coordinate system of the own vehicle or by using a line extending in the direction of travel of the other vehicle in the local coordinate system of the own vehicle. An intersection of the path of travel of the own vehicle and the path of travel of the other vehicle, that is, the collision point K1, may be geometrically calculated. The distance Dc, which is an actual distance traveled from the own vehicle to the collision point K1, may be calculated using an angle θ defined by the center of the estimated curvature radius R, the current location of the own vehicle, and the collision point K1.

The CPU 101 calculates an expected time to crossing ECT (sec) using the acquired traveling states of the own vehicle and the other vehicle (at step S120). The expected time to crossing (sec) is a time to when the own vehicle reaches the path of travel of the other vehicle under assumption that the own vehicle and the other vehicle continue their respective traveling states at the time of calculation. As used herein "When the own vehicle reaches the path of travel of the other vehicle" means when the closest point of the own vehicle to the other vehicle reaches a travel trajectory of the closest point of the other vehicle to the own vehicle. That is, the expected time to crossing ECT is a time available to stop the own vehicle without the own vehicle entering the path of travel of the other vehicle. The expected time to crossing ECT can be used as a deterministic indicator for crossing for determining whether to begin braking assistance in order to stop the own vehicle prior to the own vehicle entering the path of travel of the other vehicle. The expected time to crossing ECT can be calculated by determining an expected crossing point K2 where the path of travel of the own vehicle crosses the path of travel of the other vehicle and calculating the time it takes for the own vehicle to travel to the expected crossing point K2. The path of travel of the own vehicle and the path of travel of the other vehicle may be determined in a similar manner as described above regarding how to calculate the time to collision TTC. It should be noted that, to calculate the expected time to crossing ECT that is the time it takes for the own vehicle to reach the path of travel of the other vehicle, the path of travel of the own vehicle is calculated as an expected trajectory of the closest point of own vehicle to the other vehicle, for example, the front corner np0 on the closer side of the own vehicle to the other vehicle, and the path of travel of the other vehicle is calculated as an expected trajectory of the closest point of the other vehicle to the own vehicle, for example, the front corner np1 on the closer side of the other vehicle to the own vehicle. In an alternative embodiment, to calculate the expected time to crossing ECT, an expected trajectory of the lateral center of the own vehicle may be calculated and then the expected trajectory may be corrected by a distance from the lateral center of the own vehicle to the front corner on the closer side of the own vehicle to the other vehicle. Further, an expected trajectory of the lateral center of the other vehicle may be calculated and then the expected trajectory may be corrected by a distance from the lateral center of the other vehicle to the front corner on the closer side of the other vehicle to the own vehicle.

The expected time to crossing ECT is calculated according to the following equation.

$$ECT = Dx/V0$$

Here, Dx is a distance (m) from the own vehicle to the expected crossing point K2 and V0 (m/s) is a speed of the own vehicle.

The CPU 101 calculates a first determination time α and a second determination time β (at step S130). The first determination time α is a determination time for determining whether the deterministic indicator for collision indicates a likelihood of a collision. That is, the first determination time a is a determination time defined for collision avoidance and for determining whether to begin braking assistance to stop the own vehicle to avoid a collision. Stopping the own vehicle includes not only decreasing the vehicle speed to 0 (km/h), but also decreasing the vehicle speed to a predetermined very slow speed or lower. The first determination time α is determined from the point of view of inhibiting or preventing the driver of the own vehicle from feeling discomfort arising from braking assistance. More specifically, the first determination time a is determined using the timing at which the driver of the own vehicle can avoid a collision by an steering operation, that is, information that allows a time to collision to be estimated, for example, an overlapping degree between the own vehicle and the other vehicle, an expected impact part of the own vehicle, and an expected impact angle of the own vehicle. In this case, the first determination time α is dynamically calculated depending on the traveling states of the own vehicle and the other vehicle at the time of determination, where the first determination time a can be expressed as a function of the traveling states of the own vehicle and the other vehicle, that is, α=f(collision time estimation information). The first determination time α is determined longer as the overlapping degree decreases. The first determination time α is determined longer as the expected impact site of the own vehicle is located further away from the cabin or passenger compartment. The first determination time α is determined longer as the expected impact angle decreases. In these cases, damage to the own vehicle caused by a collision is relatively small. A collision is likely to be avoided by the driver's steering operation. Delaying the performance timing of braking assistance is intended to inhibit or prevent feeling of discomfort associated with the braking assistance. In an alternative embodiment, the first determination time α may be static. For example, a time that allows drivers within three standard deviations from the mean in a normal distribution driver model to avoid a collision by steering avoidance may be preset as the first determination time α.

The second determination time β is a determination time for determining whether the deterministic indicator for crossing indicates a likelihood of the own vehicle entering the path of travel of the other vehicle. That is, the second determination time β is a time it takes for the own vehicle to reach the expected crossing point K2 where the path of travel of the own vehicle crosses the path of travel of the other vehicle, that is, a time available for the own vehicle to stop without the own vehicle entering the path of travel of the other vehicle. Therefore, the second determination time β relates to braking performance of the own vehicle and is calculated using a depression amount or depression force that a typical driver is able to apply to a brake pedal and braking performance of the own vehicle. More specifically, the CPU 101 calculates a time it takes for the own vehicle to stop using a current speed of the own vehicle, a delay due to jerk of the braking device 502, and a reaction delay of the driver, that is, a time it takes to achieve a required deceleration needed to stop the own vehicle.

The CPU 101 determines whether a condition that TTC<α and ECT<β is met (at step S140). That is, the CPU 101 determines whether both of two conditions are met. The two conditions are a temporal condition under which braking assistance is to be performed to avoid a collision with the other vehicle and another temporal condition under which braking assistance is to be performed to stop the own vehicle without the own vehicle entering the path of travel of the other vehicle.

If determining that the condition that TTC<α and ECT<β is met ("Yes" branch of step S140), the CPU 101 determines to perform braking assistance (at step S150) and transmits a control signal to direct the driving assistance device 31 to perform braking. Then, the processing routine ends. Thus, the driving assistance device 31 actuates the braking devices 502 to decelerate the own vehicle, such that the own vehicle comes to rest upon the deceleration required to stop the own vehicle being achieved. The braking assistance may include not only emergency braking intended to make a sudden stop, but also deceleration not intended to make a vehicle stop.

If determining that the condition that TTC<α and ECT<β is not met ("No" branch of step S140), the CPU 101 determines to not perform braking assistance (at step S160). Then, the process flow ends. That is, if the time to collision TTC is equal to or greater than the first determination time α or if the expected time to crossing ECT is equal to or greater than the second determination time β, the braking assistance is not performed.

Figure 4:
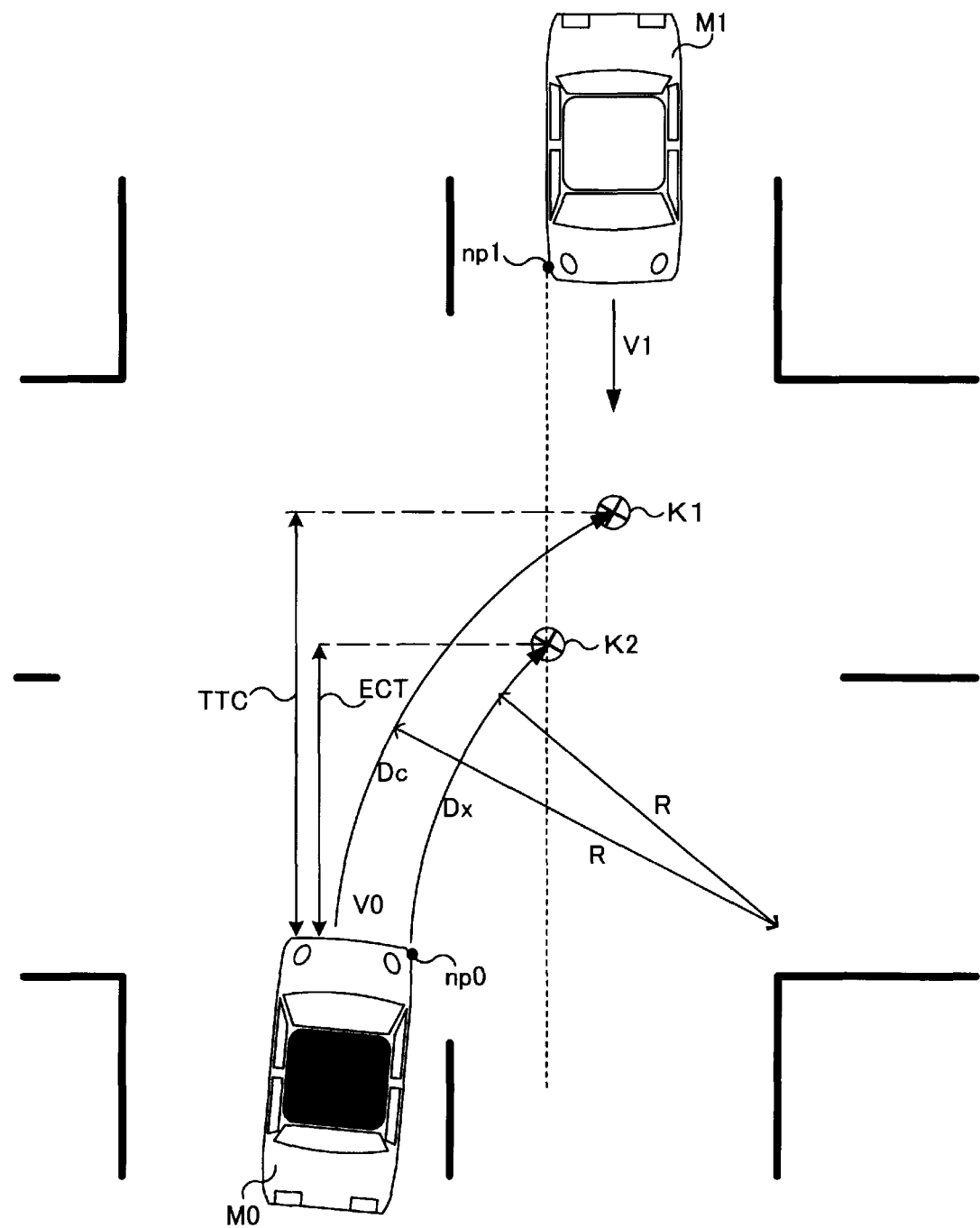
FIG. 4 is an illustration of an own vehicle that is making a right turn at an intersection and another vehicle that is traveling straight opposing the own vehicle.

An example situation where the own vehicle makes a right turn at an intersection will now be described with reference to FIGS. 4-6. Turning right in the present embodiment means turning right to cross a path of travel of an oncoming vehicle when traveling in left-hand traffic or turning left to cross a path of travel of an oncoming vehicle when in right-hand traffic. In FIG. 4 illustrating a time instant at which the own vehicle M0 begins a right turn, the driving assistance control apparatus 100 calculates the time to collision TTC and the expected time to crossing ECT using the acquired traveling state of the own vehicle M0 and the acquired traveling state of the other vehicle M1 traveling straight opposing the own vehicle M0. In FIG. 4, a collision point where the own vehicle M0 is expected to collide with the other vehicle M1 is indicated by a collision point K1. A crossing point where the own vehicle M0 is expected to reach the path of travel of the other vehicle M1 is indicated by an expected crossing point K2. If braking assistance is begun upon the time to collision TTC decreasing to below the first determination time α, the own vehicle M0 will come to rest at the collision point K1. If the other vehicle M1 is neither an oncoming vehicle nor a crossing vehicle or if the other vehicle also performs braking assistance, a collision can be avoided. Even if the other vehicle M1 does not come to rest, damage to the own vehicle M0 caused by a collision may be reduced by the own vehicle coming to rest. In addition, if braking assistance is begun upon the expected time to crossing ECT decreasing to below the second determination time β, the own vehicle M0 will come to rest without the front corner np0 of the own vehicle M0 crossing the path of travel of the other vehicle M1 defined by the front corner np1 of the other vehicle M1. As is apparent from FIG. 4, in a case where the own vehicle M0 makes a right turn, a result of determination based on the ECT is dominant.

Figure 5:
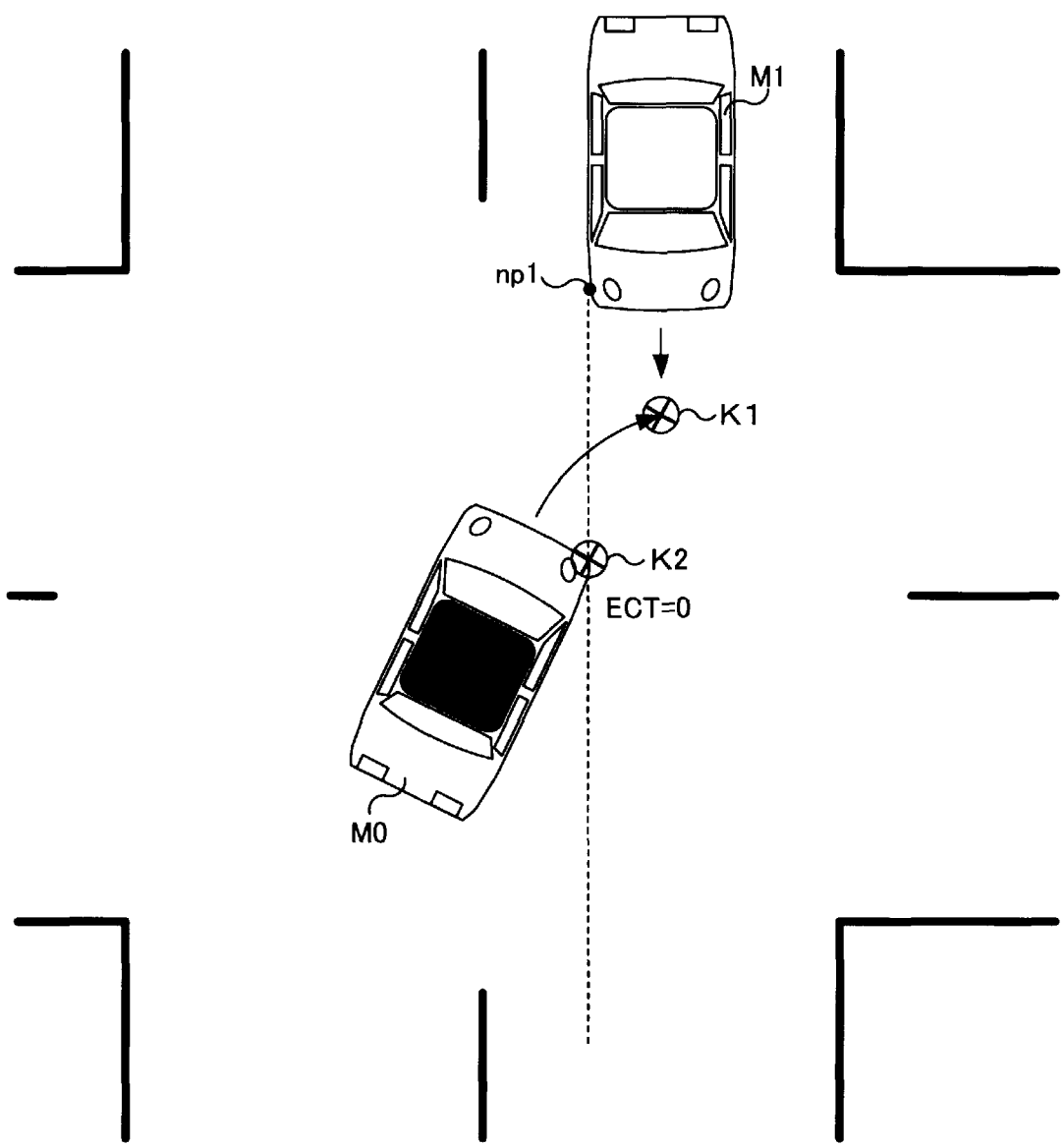
FIG. 5 is an illustration of an own vehicle that is making a right turn at an intersection and another vehicle that is traveling straight opposing the own vehicle.
Figure 6:
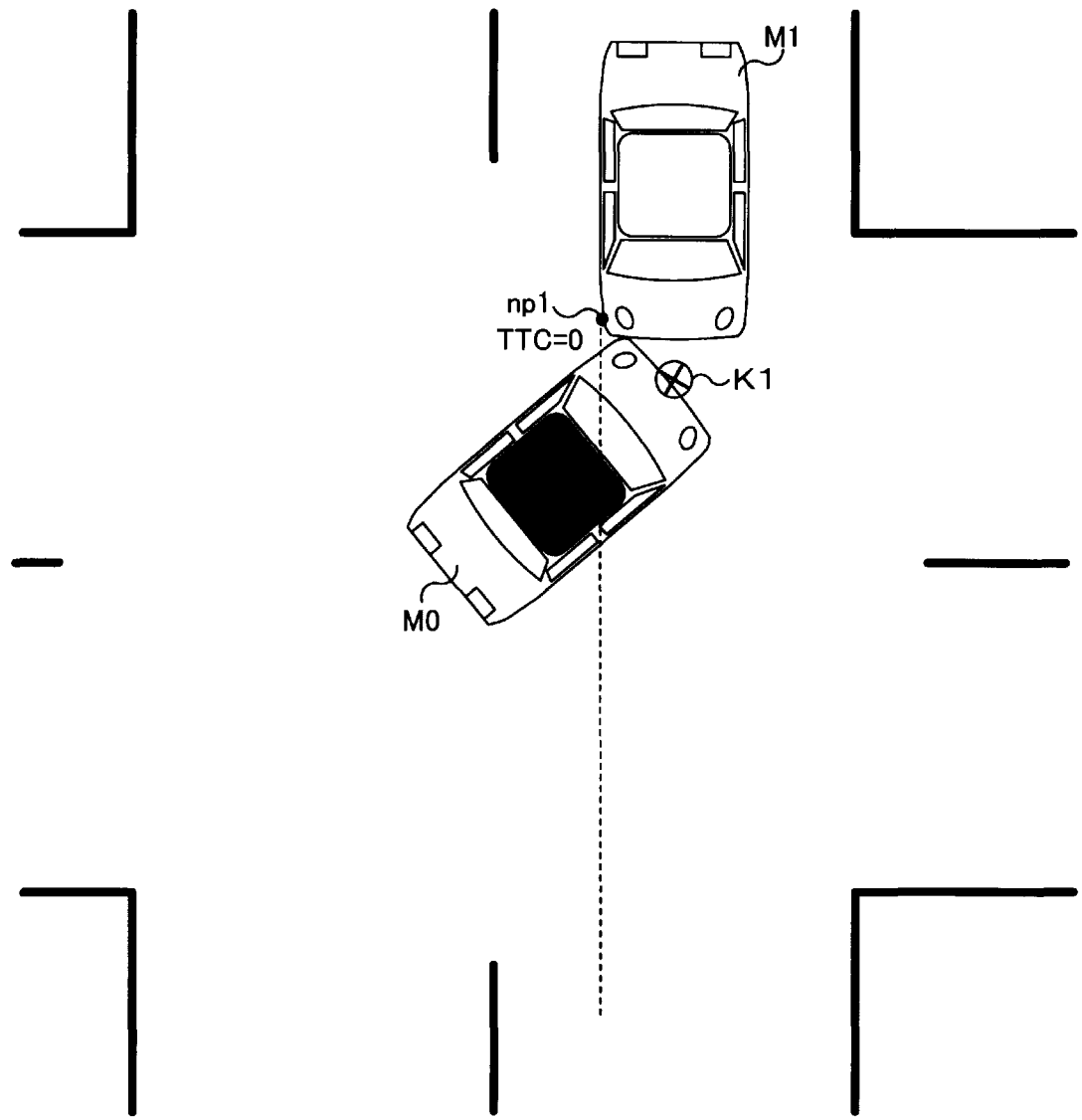
FIG. 6 is an illustration of an own vehicle that is making a right turn at an intersection and another vehicle that is traveling straight opposing the own vehicle.

As illustrated in FIG. 5, upon the own vehicle M0 making a right turn, performing braking assistance in response to the condition that TTC<α and ECT<β being met causes the own vehicle M0 to come to rest at the expected crossing point K2, particularly, without the front corner np0 of the own vehicle M0 entering the path of travel of the other vehicle M1. If a determination as to whether to perform collision avoidance by braking assistance is made using only the time to collision TTC without using the expected time to crossing ECT, the own vehicle M0 is allowed to come to rest at the collision point K1 as illustrated in FIG. 6. If the other vehicle M1 does not stop in a situation illustrated in FIG. 6, the other vehicle M1 will collide with the own vehicle M0. In the present embodiment, the driving assistance control apparatus 100 determines whether to perform braking assistance using not only the time to collision TTC, but also the expected time to crossing ECT. This allows the own vehicle M0 to come to rest without entering the path of travel of the other vehicle M1, which can prevent occurrence of a collision between the own vehicle M0 and the other vehicle M1, regardless of a behavior of the other vehicle M1, such as the other vehicle M1 coming to rest at or before the collision point K1.

Figure 7:
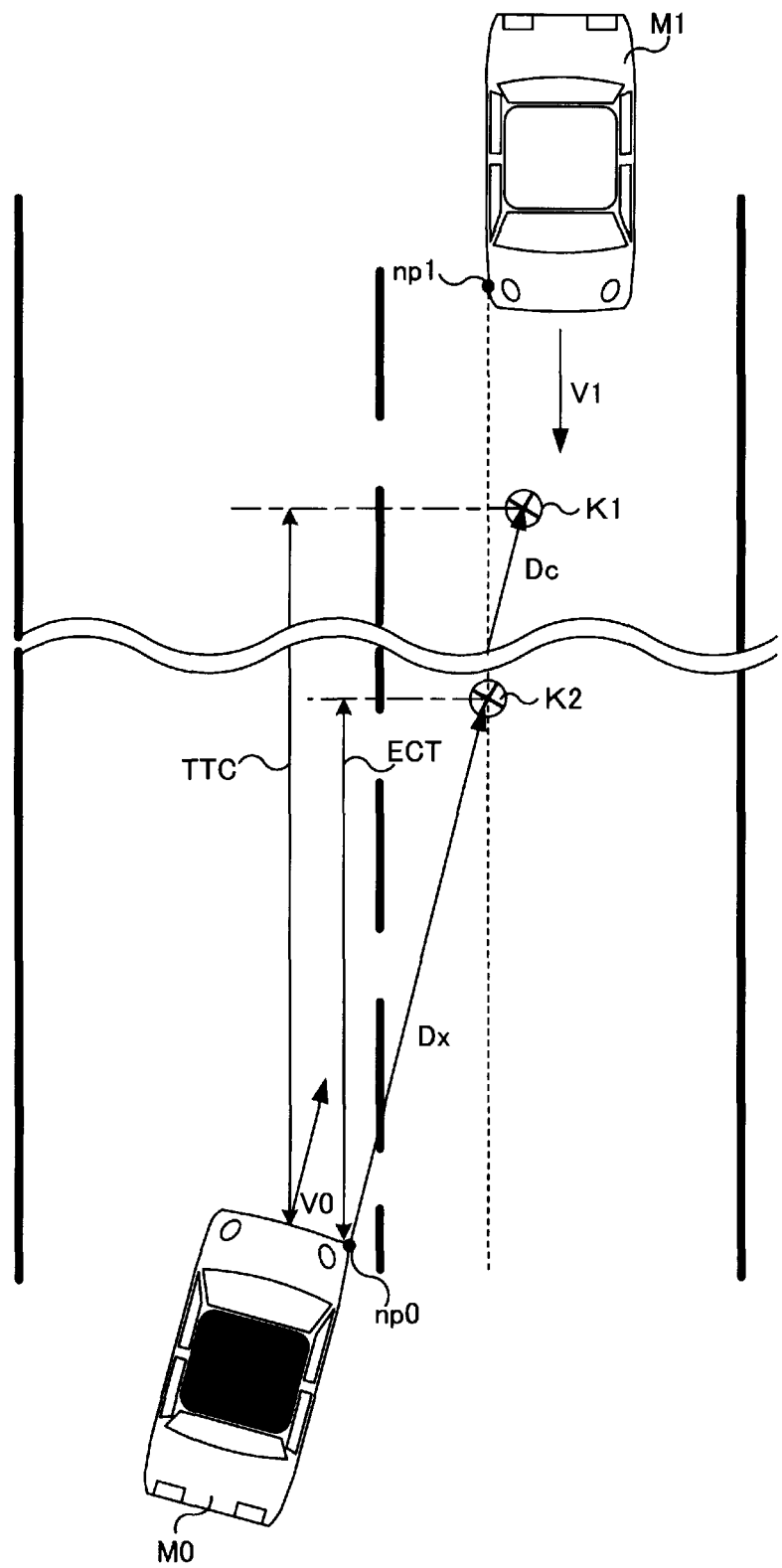
FIG. 7 is an illustration of an own vehicle that is traveling straight and another vehicle that is traveling straight opposing the own vehicle.

An example situation where the own vehicle traveling straight enters an oncoming lane will now be described with reference to FIGS. 7-9. In FIG. 7 illustrating a traveling state of the own vehicle M0 traveling toward the oncoming lane, the driving assistance control apparatus 100 calculates the time to collision TTC and the expected time to crossing ECT using the acquired traveling state of the own vehicle M0 and the acquired traveling state of the other vehicle M1 traveling straight opposing the own vehicle M0. In FIG. 7, a collision point between the own vehicle M0 and the other vehicle M1 where the time to collision TTC decreases to zero is indicated by a collision point K1, and a crossing point where the own vehicle M0 reaches the path of travel of the other vehicle M1 is indicated by an expected crossing point K2. The collision point K1 and the expected crossing point K2 have the same meanings as described above. In a case where the own vehicle M0 and the other vehicle M1 are both traveling straight, each of the collision point K1 and the expected crossing point K2 is calculated as an intersection of travel trajectories of the own vehicle M0 and the other vehicle M1. In a case where either one of the own vehicle M0 and the other vehicle M1 makes a turn, the collision point K1 and the expected crossing point K2 may be calculated in a similar manner as described above with reference to FIGS. 4-6. As is apparent from FIG. 7, in a case where the own vehicle M0 is traveling straight toward the oncoming lane, the driver's steering operation can be expected even if the own vehicle M0 enters the oncoming lane, that is, the path of travel of the other vehicle M1. A result of determination based on the time to collision TTC is dominant.

Figure 8:
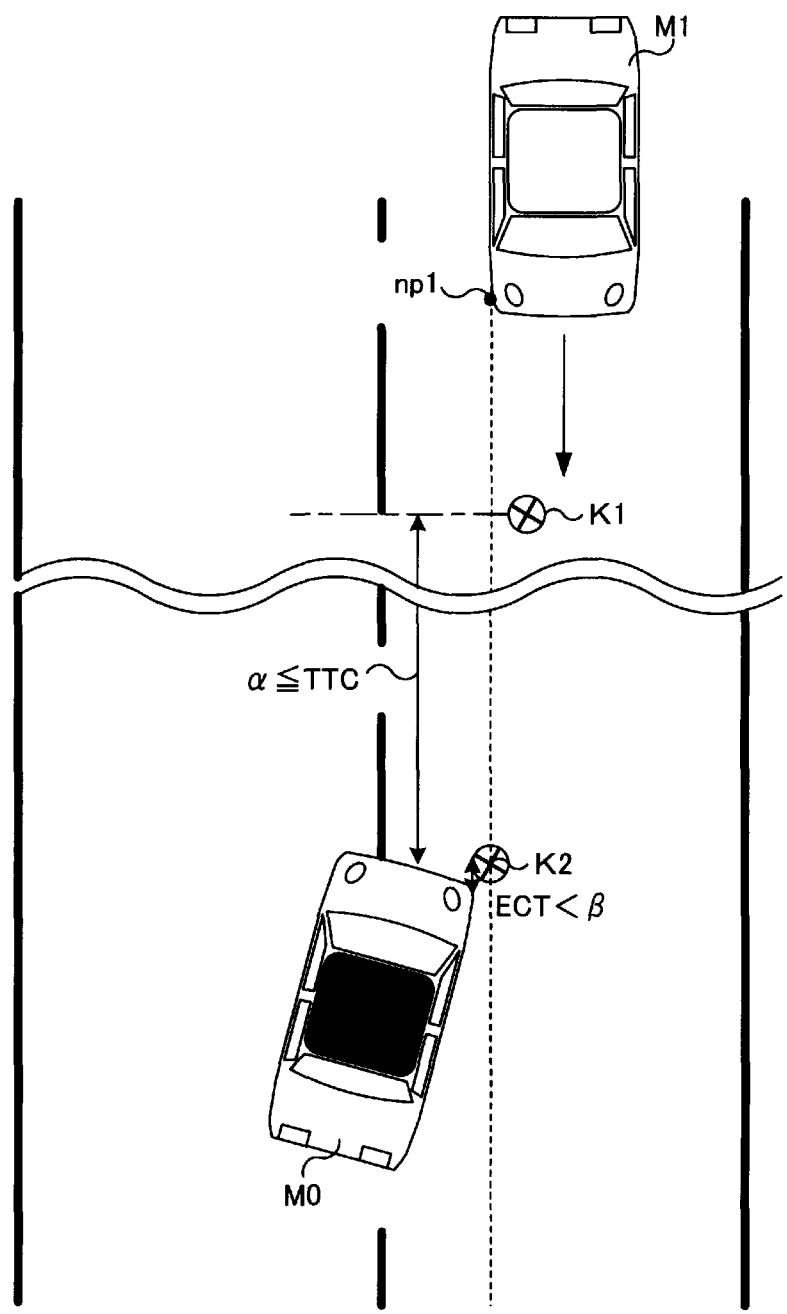
FIG. 8 is an illustration of an own vehicle that is traveling straight and another vehicle that is traveling straight opposing the own vehicle.
Figure 9:
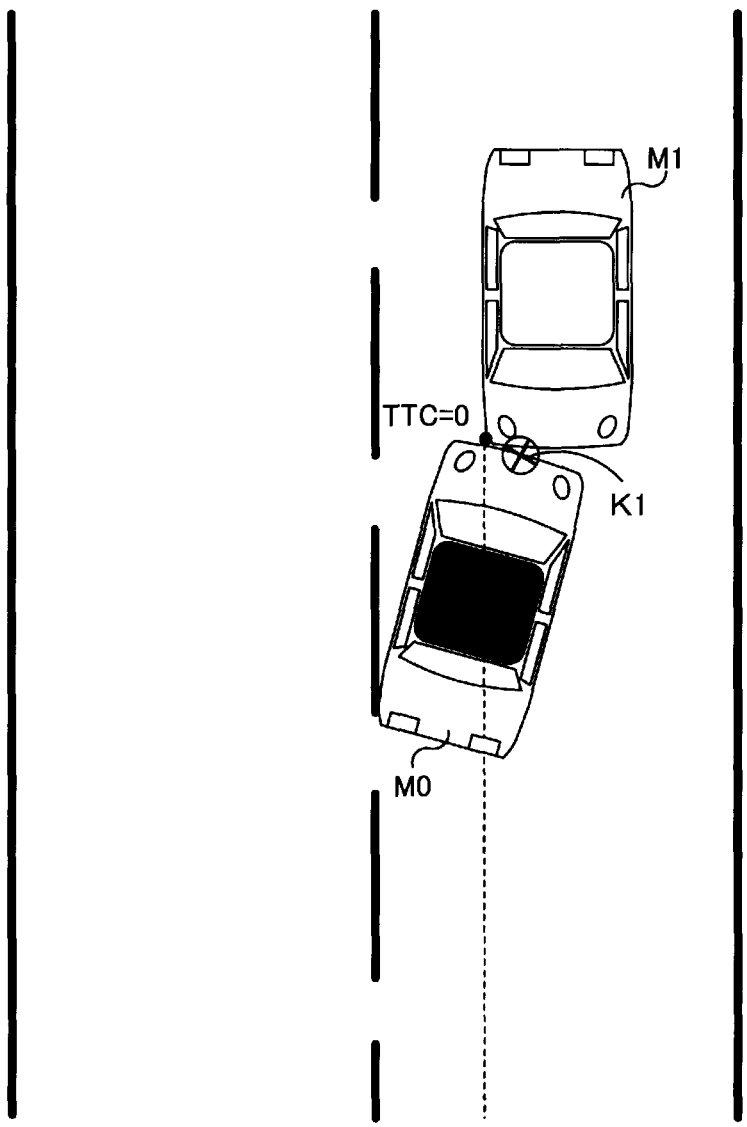
FIG. 9 is an illustration of an own vehicle that is traveling straight and another vehicle that is traveling straight opposing the own vehicle.

Since, in an example situation illustrated in FIG. 8 where the own vehicle M0 is traveling toward the oncoming lane, the expected time to crossing ECT<β, but the time to collision TTC≥α, the own vehicle M0, that is, the front corner np0 of the own vehicle M0 may travel forward beyond the expected crossing point K2 without braking assistance being performed. If a determination as to whether to perform collision avoidance by braking assistance is made using only the expected time to crossing ECT in the example situation illustrated in FIG. 8 where a collision between the own vehicle M0 and the other vehicle M1 is less likely to occur, the braking assistance will cause the own vehicle to come to rest at the expected crossing point K2 or to be decelerated toward the expected crossing point K2, which may cause the driver or other occupants to feel discomfort. In the present embodiment, the driving assistance control apparatus 100 determines whether to perform braking assistance using not only the time to collision TTC, but also the expected time to crossing ECT. Therefore, for example, after the situation illustrated in FIG. 8, the driver's steering operation may cause the own vehicle M0 to return to the own lane, leading to the expected time to crossing ECT≥β. If it is determined again that the expected time to crossing ECT<β, the own vehicle M0 enters the path of travel of the other vehicle M1 as illustrated in FIG. 9, and the time to collision TTC decreases to below a, then the braking assistance will be begun. Thus, braking assistance is performed at a timing such that collision avoidance by the driver's steering is not expected and a likelihood of a collision with the other vehicle M1 is likely to occur, which can reduce driver's feeling of discomfort. Since, upon collision with the other vehicle M1, the speed of the own vehicle M0 is decreased to zero or several km/h, the relative speed is low, and thus damage to the own vehicle M0 and the other vehicle M1 can be reduced. Therefore, when the own vehicle is traveling along a path of travel crossing a path of travel of the other vehicle, this can inhibit or prevent a collision between the own vehicle and the other vehicle and allows braking assistance to be performed at an appropriate time.

In the driving assistance control apparatus 100 according to the first embodiment described above, a determination as to whether to perform braking assistance is made using the deterministic indicator for collision and the deterministic indicator for crossing. If the deterministic indicator for collision indicates a likelihood of a collision and the deterministic indicator for crossing indicates a likelihood of the own vehicle entering the path of travel of the other vehicle, then braking assistance is determined to be performed. More specifically, the driving assistance control apparatus 100 according to the first embodiment determines whether to perform braking assistance using the time to collision TTC and the expected time to crossing ECT, and if determining to perform the braking assistance, causes the driving assistance device 31 to perform the braking assistance. Hence, when the own vehicle M0 is traveling along a path of travel crossing a path of travel of the other vehicle M1, for example, when the own vehicle is turning right and expected to enter the path of travel of the other vehicle M1, it is possible to cause the own vehicle M0 to come to rest without entering the path of travel of the other vehicle M1, which can prevent occurrence of a collision with the other vehicle M1. In addition, in a condition where a collision with the other vehicle M1 is less likely to occur or under a condition where a collision can be expected to be avoided by the driver's steering operation, for example, in a case where the own vehicle M0 enters or protrudes into the path of travel of the other vehicle M1 when the own vehicle M0 is traveling straight forward, making a determination to perform braking assistance will be withheld until the time to collision TTC and the expected time to crossing ECT decrease to below their respective determination times, which can mitigate or prevent the driver from feeling discomfort due to frequent performance of braking assistance or too early performance of braking assistance. As above, an event can be eliminated that may pose a problem with using either one of the deterministic indicator for collision and the deterministic indicator for crossing.

In the first embodiment, an example situation has been described where the own vehicle M0 is turning or traveling toward the path of travel of the other vehicle M1. Similar advantages can also be provided in an opposite situation where the other vehicle M1 is turning or traveling toward the path of travel of the own vehicle M0.

Second Embodiment

As described above, in the first embodiment, an example situation has been described where the other vehicle M1 is an oncoming vehicle forward of the own vehicle M0. In a second embodiment, an example situation will be described where the other vehicle M2 is a crossing vehicle forward of the own vehicle M0. The driving assistance control apparatus and the driving assistance system used in the second embodiment are the same as the driving assistance control apparatus 100 and the driving assistance system 10 used in the first embodiment. Therefore, the elements of the second embodiment having the same functions as in the first embodiment are numbered the same and duplicate description will be omitted.

Figure 10:
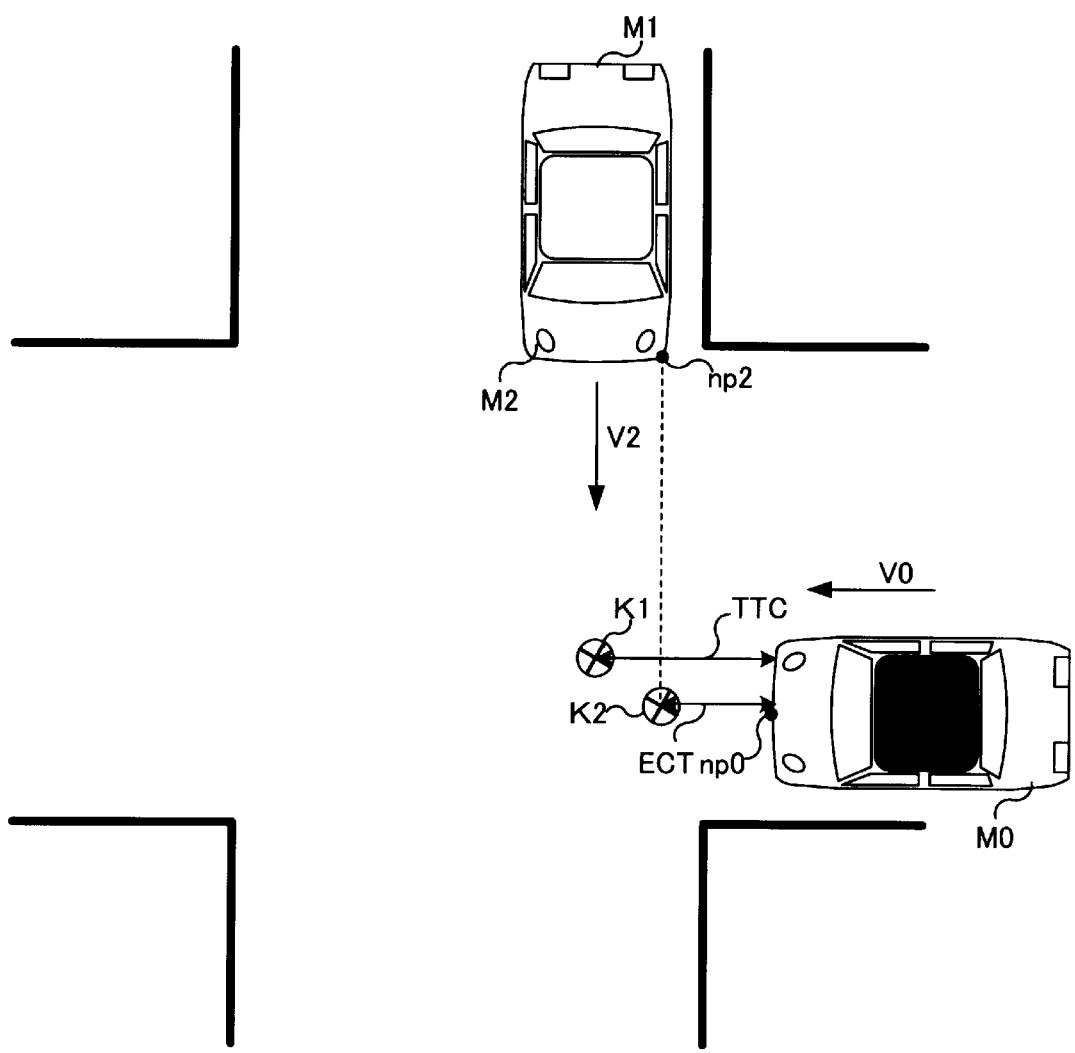
FIG. 10 is an illustration of an own vehicle traveling straight and another vehicle that intersects the own vehicle.

In FIG. 10, the other vehicle M2 is a crossing vehicle traveling forward of the own vehicle M0 traveling straight toward an intersection. Here too, a collision point K1 and an expected crossing point K2 are calculated, where the collision point K1 is an intersection of the path of travel of the own vehicle M0 and the path of travel of the other vehicle M2 and the expected crossing point K2 is an intersection of a line extending in the travel direction of the own vehicle M0 from the closest site np0 of the own vehicle M0 to the other vehicle M2 and a line extending in the travel direction of the other vehicle M1 from the closest site np1 of the other vehicle M1 to the own vehicle M0. Similarly, in the second embodiment, using the time to collision TTC and the expected time to crossing ECT allows the own vehicle M0 to come to rest without the own vehicle M0 entering the path of travel of the other vehicle M2 that is a crossing vehicle traveling forward of the own vehicle M0, which can prevent occurrence of a collision with the other vehicle M2.

Modifications (1) In the first and second embodiments set forth above, the time to collision TTC and the expected time to crossing ECT are used. In an alternative embodiment, a distance to collision DTC and an expected distance to crossing ECD may be used. That is, the driving assistance process illustrated in FIG. 3 may be performed using a distance Dc to the collision point K1, a distance Dx to the expected crossing point K2, a first determination distance $\alpha d$, and a second determination distance $\beta d$. In such an embodiment, the condition at step S140 may be replaced with a condition that DTC<$\alpha d$ and ECD<$\beta d$. In addition, a required deceleration to collision that is a deceleration required to decrease the travel speed of the own vehicle M0 to 0 km/h at the collision point K1 and a required deceleration to crossing that is a deceleration required to decrease the travel speed of the own vehicle M0 to 0 km/h at the expected crossing point K2 may be used. That is, the driving assistance process illustrated in FIG. 3 may be performed by using the deceleration required before the collision point K1, the deceleration required before the crossing point K2, a first determination deceleration $\alpha b$, and a second determination deceleration $\beta b$, where the condition at step S140 may be replaced with a condition that the required deceleration to collision $\alpha b$ and the required deceleration to crossing $\beta b$. That is, in order to prevent a required deceleration achievable by the own vehicle M0 from being exceeded, braking assistance may be performed when the preset determination decelerations are exceeded, thereby causing the own vehicle M0 to come to rest before the collision point K1 and the expected crossing point K2. Such an embodiment can also provide similar advantages as in the first and second embodiments. In another alternative embodiment, braking assistance may be performed using an arbitrary combination of the time, the distance, and the required deceleration. In such an embodiment, various indicators may be used, which may increase the accuracy of determination as to whether to perform braking assistance.

(2) In the first and second embodiments set forth above, the local coordinate system of the own vehicle M0 is used. In an alternative embodiment, a world coordinate system may be used that defines a road environment in which the own vehicle M0 and other vehicles M1, M2 are located. In such an embodiment where the world coordinate system is used, it is possible to process positions and behaviors of the plurality of vehicles based on their absolute locations, which can facilitate a driving assistance process in a traffic management system that manages the plurality of vehicles.

(3) In the first and second embodiments set forth above, the other vehicle M1 as an oncoming vehicle relative to the own vehicle M0 and the other vehicle M2 as a crossing vehicle relative to the own vehicle M0 have been described. Collision avoidance with another vehicle that is traveling ahead of the own vehicle M0 may also be determined in a similar manner as in the driving assistance process illustrated in FIG. 3. Since the own vehicle following another vehicle that is traveling ahead of the own vehicle can be deemed as having already entered the path of travel of the other vehicle, the expected time to crossing ECT=0. Thus, ECT<$\beta$ is always met. Substantially, the determination process at step S150 may be performed using only the condition of the time to collision TTC. In such a case, the time to collision TTC may be calculated using a relative speed and a distance between the own vehicle and the other vehicle. Therefore, the process flow illustrated in FIG. 3 may be applied to the braking assistance process for of other vehicles of various aspects.

(4) In the first and second embodiments set forth above, braking assistance to cause the own vehicle M0 to come to rest at the collision point K1 is performed without taking into account travel speeds of the other vehicles M1, M2. In an alternative embodiment, taking into account a time it takes for each of the other vehicles M1, M2 to reach the collision point K1 may be calculated as an other-vehicle's arrival time, and the braking assistance may be performed if a difference between the time to collision TTC and the other-vehicle's arrival time is equal to or less than a predetermined reference value. If there is a large difference between the time to collision TTC and the other-vehicle's arrival time, the own vehicle M0 may be capable of passing the collision point K1 without contacting the other vehicles M1, M2, or the other vehicles M1, M2 may be capable of passing the collision point K1 without contacting the own vehicle M0. This can suppress the performance frequency of braking assistance and can further mitigate the driver's feeling of discomfort.

(5) In the foregoing embodiment, the controller is implemented by means of software by the CPU 101 executing the driving assistance program P1. In an alternative embodiment, the controller may be implemented by means of hardware by a pre-programmed integrated circuit or discrete circuit.

As above, the present disclosure has been described based on the embodiments and modifications. However, the embodiments of the present disclosure described above are intended to make the present disclosure easy to understand and should not be interpreted as limiting the present disclosure. The present disclosure can be modified or improved without deviating from the gist of the present disclosure and the scope of the claims, and the present disclosure includes its equivalents. For example, the technical features of the embodiments and modifications corresponding to the technical features of the modes described in the introductory part can be replaced or combined as appropriate to solve some or all of the issues described above or attain some or all of the advantageous effects described above. In addition, the technical features can be deleted as appropriate unless they are described herein as being essential.

For example, the driving assistance control apparatus for a vehicle according to the first aspect described above can be set as Example 1.

Example 2: In the driving assistance control apparatus according to Example 1, the controller is configured to, in response to the deterministic indicator for collision indicating a likelihood of a collision and the deterministic indicator for crossing indicating a likelihood of entering the path of travel of the other vehicle, determine to perform the braking assistance.

Example 3: In the driving assistance control apparatus according to Example 1, the controller is configured to calculate a time to collision as the deterministic indicator for collision and an expected time to crossing as the deterministic indicator for crossing, and in response to the time to collision calculated being less than a first determination time and the expected time to crossing calculated being less than a second determination time, determine to perform the braking assistance.

Example 4: In the driving assistance control apparatus according to Example 3, the controller is configured to, in response to the time to collision being equal to or greater than the first determination time or the expected time to crossing being equal to or greater than the second determination time, determine to not perform the braking assistance.

Example 5: In the driving assistance control apparatus according to Example 1, the controller is configured to calculate a distance to collision as the deterministic indicator for collision and an expected distance to crossing as the deterministic indicator for crossing, and in response to the distance to collision calculated being equal to or greater than a first determination distance and the expected distance to crossing calculated being equal to or greater than a second determination distance, determine to perform the braking assistance.

Example 6: In the driving assistance control apparatus according to Example 1, the controller is configured to calculate a required deceleration to collision as the deterministic indicator for collision and a required deceleration to crossing as the deterministic indicator for crossing, and in response to the required deceleration to collision calculated being equal to or greater than a first determination deceleration and the required deceleration to crossing calculated being equal to or greater than a second determination deceleration, determine to perform the braking assistance.

What is claimed is:

1. A driving assistance control apparatus for a vehicle, comprising:
    an acquirer configured to acquire a detected traveling state of the vehicle and a detected traveling state of an other vehicle; and
    a controller configured to determine whether to perform braking assistance using both a deterministic indicator for collision and a deterministic indicator for crossing,
        the deterministic indicator for collision including at least one of
            a time to collision with the other vehicle,
            a distance to collision with the other vehicle, and
            a required deceleration to collision with the other vehicle in which the collision with the other vehicle occurs at a collision point, and
        the deterministic indicator for crossing including at least one of
            a time to reaching an expected crossing point on a path of travel of the other vehicle,
            a distance to reaching the expected crossing point, and
            a required deceleration to reaching the expected crossing point,
        the expected crossing point being a point where a part of the vehicle is expected to first reach the path of travel of the other vehicle,
        the deterministic indicator for collision and the deterministic indicator for crossing being acquired using the acquired traveling state of the vehicle and the acquired traveling state of the other vehicle, and
        in response to determining to perform the braking assistance, cause a driving assistance unit to perform the braking assistance.

2. The driving assistance control apparatus according to claim 1, wherein
    the controller is configured to, in response to the deterministic indicator for collision indicating a likelihood of a collision and the deterministic indicator for crossing indicating a likelihood of entering the path of travel of the other vehicle, determine to perform the braking assistance.

3. The driving assistance control apparatus according to claim 1, wherein
    the controller is configured to calculate a time to collision as the deterministic indicator for collision and an expected time to crossing as the deterministic indicator for crossing, and in response to the time to collision calculated being less than a first determination time and the expected time to crossing calculated being less than a second determination time, determine to perform the braking assistance.

4. The driving assistance control apparatus according to claim 3, wherein
    the controller is configured to, in response to the time to collision being equal to or greater than the first determination time or the expected time to crossing being equal to or greater than the second determination time, determine to not perform the braking assistance.

5. The driving assistance control apparatus according to claim 1, wherein
    the controller is configured to calculate a distance to collision as the deterministic indicator for collision and an expected distance to crossing as the deterministic indicator for crossing, and in response to the distance to collision calculated being equal to or greater than a first determination distance and the expected distance to crossing calculated being equal to or greater than a second determination distance, determine to perform the braking assistance.

6. The driving assistance control apparatus according to claim 1, wherein
    the controller is configured to calculate a required deceleration to collision as the deterministic indicator for collision and a required deceleration to crossing as the deterministic indicator for crossing, and in response to the required deceleration to collision calculated being equal to or greater than a first determination deceleration and the required deceleration to crossing calculated being equal to or greater than a second determination deceleration, determine to perform the braking assistance.

7. A driving assistance control apparatus for a vehicle in an intersection, comprising:
    an acquirer configured to acquire a traveling state of the vehicle and a traveling state of an other vehicle that enters the intersection from an oncoming lane; and
    a controller configured to determine whether to perform braking assistance using both a deterministic indicator for collision and a deterministic indicator for crossing, the deterministic indicator for collision including at least one of
a time to collision with the other vehicle,
a distance to collision with the other vehicle, and
a required deceleration to collision with the other vehicle in which the collision with the other vehicle occurs at a collision point, and
the deterministic indicator for crossing including at least one of
a time to reaching an expected crossing point on a path of travel of the other vehicle,
a distance to reaching the expected crossing point,
a required deceleration to reaching the expected crossing point,
the expected crossing point being a point where a part of the vehicle is expected to first reach the path of travel of the other vehicle,
the deterministic indicator for collision and the deterministic indicator for crossing being acquired using the acquired traveling state of the vehicle and the acquired traveling state of the other vehicle, and
in response to determining to perform the braking assistance, cause a driving assistance unit to perform the braking assistance.

8. A driving assistance system for a vehicle comprising:
a driving assistance control apparatus, comprising:
an acquirer configured to acquire a detected traveling state of the vehicle and a detected traveling state of an other vehicle; and
a controller configured to determine whether to perform braking assistance using both a deterministic indicator for collision and a deterministic indicator for crossing,
the deterministic indicator for collision including at least one of
a time to collision with the other vehicle,
a distance to collision with the other vehicle, and
a required deceleration to collision with the other vehicle in which the collision with the other vehicle occurs at a collision point, and
the deterministic indicator for crossing including at least one of
a time to reaching an expected crossing point on a path of travel of the other vehicle,
a distance to reaching the expected crossing point, and
a required deceleration to reaching the expected crossing point,
the expected crossing point being a point where a part of the vehicle is expected to first reach the path of travel of the other vehicle,
the deterministic indicator for collision and the deterministic indicator for crossing being acquired using the acquired traveling state of the vehicle and the acquired traveling state of the other vehicle, and
in response to determining to perform the braking assistance, cause a driving assistance unit to perform the braking assistance;
a first detector configured to detect the traveling state of the vehicle, and a second detector configured to the traveling state of the other vehicle; and
a driving assistance unit configured to perform the braking assistance.

9. A driving assistance system for a vehicle in an intersection, comprising:
a driving assistance control apparatus comprising:
an acquirer configured to acquire a traveling state of the vehicle and a traveling state of an other vehicle that enters the intersection from an oncoming lane; and
a controller configured to determine whether to perform braking assistance using both a deterministic indicator for collision and a deterministic indicator for crossing,
the deterministic indicator for collision including at least one of
a time to collision with the other vehicle,
a distance to collision with the other vehicle, and
a required deceleration to collision with the other vehicle in which the collision with the other vehicle occurs at a collision point, and
the deterministic indicator for crossing including at least one of
a time to reaching an expected crossing point on a path of travel of the other vehicle,
a distance to reaching the expected crossing point, and
a required deceleration to reaching the expected crossing point,
the expected crossing point being a point where a part of the vehicle is expected to first reach the path of travel of the other vehicle,
the deterministic indicator for collision and the deterministic indicator for crossing being acquired using the acquired traveling state of the vehicle and the acquired traveling state of the other vehicle, and
in response to determining to perform the braking assistance, cause a driving assistance unit to perform the braking assistance;
a first detector configured to detect the traveling state of the vehicle, and a second detector configured to the traveling state of the other vehicle; and
a driving assistance unit configured to perform the braking assistance.

10. A driving assistance control method for a vehicle, comprising:
acquiring a detected traveling state of the vehicle and a detected traveling state of an other vehicle; and
determining whether to perform braking assistance using both a deterministic indicator for collision and a deterministic indicator for crossing,
the deterministic indicator for collision including at least one of
a time to collision with the other vehicle,
a distance to collision with the other vehicle, and
a required deceleration to collision with the other vehicle in which the collision with the other vehicle occurs at a collision point, and
the deterministic indicator for crossing including at least one of
a time to reaching an expected crossing point on a path of travel of the other vehicle,
a distance to reaching the expected crossing point, and
a required deceleration to reaching the expected crossing point,
the expected crossing point being a point where a part of the vehicle is expected to first reach the path of travel of the other vehicle,
the deterministic indicator for collision and the deterministic indicator for crossing being acquired using the acquired traveling state of the vehicle and the acquired traveling state of the other vehicle, and in response to determining to perform the braking assistance, causing a driving assistance unit to perform the braking assistance.

11. A driving assistance control method for a vehicle in an intersection, comprising:

acquiring a traveling state of the vehicle and a traveling state of an other vehicle that enters the intersection from an oncoming lane; and determining whether to perform braking assistance using both a deterministic indicator for collision and a deterministic indicator for crossing, the deterministic indicator for collision including at least one of a time to collision with the other vehicle, a distance to collision with the other vehicle, and a required deceleration to collision with the other vehicle in which the collision with the other vehicle occurs at a collision point, and the deterministic indicator for crossing including at least one of a time to reaching an expected crossing point on a path of travel of the other vehicle, a distance to reaching the expected crossing point, and a required deceleration to reaching the expected crossing point, the expected crossing point being a point where a part of the vehicle is expected to first reach the path of travel of the other vehicle, the deterministic indicator for collision and the deterministic indicator for crossing being acquired using the acquired traveling state of the vehicle and the acquired traveling state of the other vehicle, and in response to determining to perform the braking assistance, causing a driving assistance unit to perform the braking assistance.

\* \* \* \* \*